US00RE48151E

(19) United States
(12) Reissued Patent
Collins

(10) Patent Number: US RE48,151 E
(45) Date of Reissued Patent: Aug. 11, 2020

(54) HARD SURFACE VENEER AND WOOD POLYMER COMPOSITE FLOORING TILE

(71) Applicant: The Matworks Company LLC, Beltsville, MD (US)

(72) Inventor: Robert Collins, Beltsville, MD (US)

(73) Assignee: The Matworks Company, LLC, Beltsville, MD (US)

(21) Appl. No.: 16/508,051

(22) Filed: Jul. 10, 2019

Related U.S. Patent Documents

Reissue of:
(64) Patent No.: 9,896,851
Issued: Feb. 20, 2018
Appl. No.: 14/686,272
Filed: Apr. 14, 2015

(51) Int. Cl.

| | |
|---|---|
| ***E04F 15/02*** | (2006.01) |
| ***B32B 37/24*** | (2006.01) |
| ***E04F 15/08*** | (2006.01) |
| ***B32B 37/12*** | (2006.01) |
| ***B32B 37/00*** | (2006.01) |

(52) U.S. Cl.
CPC ..... *E04F 15/02038* (2013.01); *E04F 15/085* (2013.01); *B32B 2317/16* (2013.01); *B32B 2471/00* (2013.01); *E04F 2201/0107* (2013.01); *E04F 2201/023* (2013.01)

(58) Field of Classification Search
CPC ..... E04F 15/082; E04F 15/02038; E04F 2201/0107; E04F 2201/023; B32B 37/0076; B32B 37/12; B32B 37/24; B32B 2317/16; B32B 2471/00
See application file for complete search history.

(56) References Cited

U.S. PATENT DOCUMENTS

| | | | | |
|---|---|---|---|---|
| 3,720,027 A * | 3/1973 | Christensen | E04C 2/243 | 52/309.8 |
| 5,182,891 A * | 2/1993 | Slocum | E04F 15/022 | 52/392 |
| 5,437,934 A * | 8/1995 | Witt | B32B 13/10 | 428/191 |
| 6,101,778 A * | 8/2000 | Mårtensson | E04B 1/6129 | 52/582.1 |

(Continued)

OTHER PUBLICATIONS

Non-Final Office Action issued by The United States Patent and Trademark Office for U.S. Appl. No. 14/686,272, dated Feb. 12, 2016, 17 pages.

(Continued)

*Primary Examiner* — Joseph A Kaufman
(74) *Attorney, Agent, or Firm* — Cooley LLP

(57) ABSTRACT

An apparatus includes a first floor tile that includes a bottom layer that is composed of a wood polymer composite and having a main portion, a tongue portion extending beyond a first edge of the main portion, a groove portion extending within the main portion at a second edge of the main portion opposite the first edge, the base portion having a width. The first floor tile includes a top layer that is composed of ceramic and having a width greater than the width of the main portion, the top layer fixed to the bottom layer such that (1) a first edge of the top layer extends beyond the first edge of the main portion and covers a portion of the tongue portion, (2) a second edge of the top layer extends beyond the second edge of the main portion and covers a portion of the tongue portion.

20 Claims, 5 Drawing Sheets

(56) References Cited

U.S. PATENT DOCUMENTS

| | | | | |
|---|---|---|---|---|
| 7,442,423 | B2 * | 10/2008 | Miller | B32B 7/02 428/212 |
| 7,721,502 | B2 | 5/2010 | Scott et al. | |
| 7,993,731 | B2 | 8/2011 | Miller et al. | |
| 8,726,603 | B2 * | 5/2014 | Huang | E04F 15/02 52/591.1 |
| 8,806,830 | B2 * | 8/2014 | Schacht | E04F 15/02 52/588.1 |
| 8,919,063 | B2 * | 12/2014 | Oldorff | E04F 15/02033 52/313 |
| 9,187,899 | B2 * | 11/2015 | Nam | E04C 2/26 |
| 9,440,257 | B2 * | 9/2016 | Braun | B05D 5/10 |
| 9,487,958 | B2 * | 11/2016 | Roy | E04F 15/042 |
| 9,896,851 | B1 | 2/2018 | Collins | |
| 2006/0024465 | A1 * | 2/2006 | Briere | B32B 3/04 428/60 |
| 2008/0226865 | A1 * | 9/2008 | Ljosland | B27B 5/075 428/99 |
| 2013/0104485 | A1 * | 5/2013 | Meersseman | E04F 13/0894 52/578 |

OTHER PUBLICATIONS

Non-Final Office Action issued by The United States Patent and Trademark Office for U.S. Appl. No. 14/686,272, dated Jan. 18, 2018, 16 pages.

Final Office Action issued by The United States Patent and Trademark Office for U.S. Appl. No. 14/686,272, dated Sep. 6, 2016, 13 pages.

Final Office Action issued by The United States Patent and Trademark Office for U.S. Appl. No. 14/686,272, dated May 9, 2017, 15 pages.

* cited by examiner

HARD SURFACE VENEER AND WOOD POLYMER COMPOSITE FLOORING TILE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The embodiments described herein relate to floor tiles, specifically floor tiles including a hard surface veneer layer fixed to a wood polymer composite layer.

Known hard surface flooring tiles, for example ceramic tile are installed by semi-permanently or permanently fixing individual tiles directly to a surface to be covered with an adhesive, such as mortar. Furthermore, such individual floor tiles may require additional sealant between each floor tile and each adjacent floor tile for moisture control.

Thus, a need exists for an improved floor tile and floor tiling system that can be installed without semi-permanently or permanently fixing individual tiles directly to the surface to be covered and that does not require additional sealant for moisture control.

SUMMARY

In some embodiments a floor tile system includes a first floor tile and a second floor tile. The second floor tile includes a bottom layer that is composed of a wood polymer composite and having a main portion and a groove portion that extends within the main portion at an edge of the main portion. The second floor tile further includes a top layer composed of ceramic tile and fixed to the bottom layer such that an edge of the top layer extends beyond the edge of the bottom layer. The first floor tile includes a bottom layer that is composed of a wood polymer composite and having a main portion, a tongue portion that extends beyond a first edge of the main portion, a groove portion extending within the main portion at a second edge of the main portion opposite the first edge, the base portion having a width. The first floor tile includes a top layer that is composed of ceramic and having a width greater than the width of the main portion, the top layer fixed to the bottom layer such that (1) a first edge of the top layer extends beyond the first edge of the main portion and covers a portion of the tongue portion, (2) a second edge of the top layer extends beyond the second edge of the main portion and covers a portion of the tongue portion. In such a floor tile system, the tongue portion of the bottom layer of the first floor tile is configured to be inserted into the groove portion of the bottom layer of the second floor tile such that (1) an end of the tongue portion the bottom layer of the first floor tile does not contact an end of the groove portion of the bottom portion of the second floor tile, and (2) the first edge of the top layer of the first floor tile contacts the edge of the top layer of the second floor tile to define a seal.

DETAILED DESCRIPTION

Figure 1A:
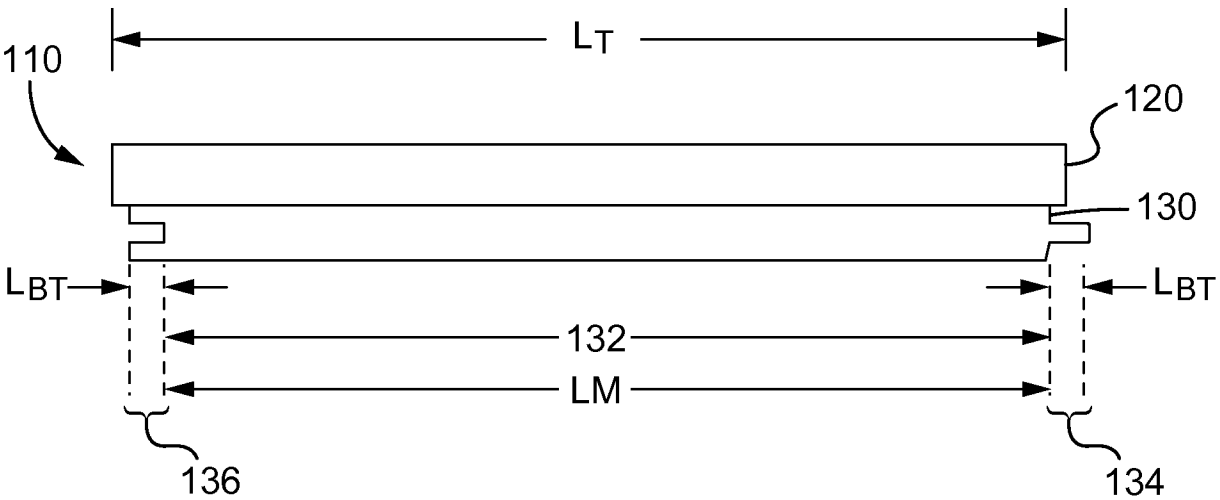
FIG. 1A is a cross-sectional view of floor tile according to an embodiment.

In some embodiments a floor tile system includes a first floor tile and a second floor tile. The second floor tile includes a bottom layer that is composed of a wood polymer composite and having a main portion and a groove portion that extends within the main portion at an edge of the main portion. The second floor tile further includes a top layer composed of ceramic tile and fixed to the bottom layer such that an edge of the top layer extends beyond the edge of the bottom layer. The first floor tile includes a bottom layer that is composed of a wood polymer composite and having a main portion, a tongue portion that extends beyond a first edge of the main portion, a groove portion extending within the main portion at a second edge of the main portion opposite the first edge, the base portion having a width. The first floor tile includes a top layer that is composed of ceramic and having a width greater than the width of the main portion, the top layer fixed to the bottom layer such that (1) a first edge of the top layer extends beyond the first edge of the main portion and covers a portion of the tongue portion, (2) a second edge of the top layer extends beyond the second edge of the main portion and covers a portion of the tongue portion. In such a floor tile system, the tongue portion of the bottom layer of the first floor tile is configured to be inserted into the groove portion of the bottom layer of the second floor tile such that (1) an end of the tongue portion the bottom layer of the first floor tile does not contact an end of the groove portion of the bottom portion of the second floor tile, and (2) the first edge of the top layer of the first floor tile contacts the edge of the top layer of the second floor tile to define a seal.

In some embodiments an apparatus includes a first floor tile configured to be interlocked with a second floor tile that includes (1) a bottom layer that is composed of a wood polymer composite and having a base portion, a groove portion extending within the base portion at an edge of the base portion, and (2) a top layer composed of ceramic tile an fixed to the bottom layer such that an edge of the top layer extends beyond the edge of the bottom layer. The first floor tile includes a bottom layer that is composed of a wood polymer composite and having a base portion, a first tongue portion extending beyond a first edge of the base portion, a second tongue portion extending beyond a second edge of the base portion that is perpendicular to the first edge of the base portion, a first groove portion extending within the base portion at a third edge of the base portion opposite the first edge, and a second groove portion extending within the base portion at a fourth edge of the base portion opposite the second edge of the base portion, the base portion having a width and a height. The top layer is composed of ceramic and has (1) a width greater than the width of the base portion and (2) a length greater than the length of the base portion. The top portion is fixed to the base portion such that (1) a first edge of the top layer extends beyond the first edge of the base portion and covers a portion of the first tongue portion, (2) a second edge of the top layer extends beyond the second edge of the base portion and covers a portion of the second tongue portion, (3) a third edge of the top layer extends beyond the third edge of the bottom layer, and (4) a fourth edge of the top layer extends beyond the fourth edge of the bottom layer. The first tongue portion of the first tile is configured to be inserted into the groove portion of the second tile such that (1) an end of the first tongue portion of the first tile does not contact an end of the groove portion of the second tile, and (2) the first edge of the top layer of the first tile contacts the edge of the top layer of the second tile.

In some embodiments a method includes assembling a floor tile system that includes at least a first floor tile and a second floor tile. The method includes defining and assembling the first floor tile and defining and assembling the second floor tile. The method includes defining, by injecting wood polymer composite into a mold to define a first bottom layer blank and machining the first bottom layer blank to define, a bottom layer of the second tile to include a main portion, a groove portion extending within the main portion at an edge of the main portion. The method includes defining, by cutting a ceramic material, a top layer of the second tile. The method includes fixing, using an adhesive, the top layer of the second floor tile to the bottom layer of the second floor tile such that an edge of the top layer of the second floor tile extends beyond the edge of the bottom layer of the second floor tile.

The method further includes defining, by injecting wood polymer composite into a mold to define a second bottom layer blank and machining the second bottom layer blank to define, a bottom layer of the first tile to include (1) a main portion, (2) a tongue portion extending beyond a first edge of the main portion, and (3) a groove portion extending within the main portion at a second edge of the main portion opposite the first edge, the base portion having a width. The method includes defining, by cutting a ceramic material, a top layer of the first floor tile to have a width greater than the width of the main portion of the bottom layer of the first floor tile. The method includes fixing, using an adhesive, the top layer of the first floor tile to the bottom layer of the first floor tile such that (1) a first edge of the top layer of the first floor tile extends beyond the first edge of the main portion of the bottom layer of the first floor tile and covers a portion of the tongue portion of the bottom layer of the first floor tile, (2) a second edge of the top layer of the first floor tile extends beyond the second edge of the main portion of the bottom layer of the first floor tile and covers a portion of the tongue portion of the bottom layer of the first floor tile.

As used in this specification, the singular forms "a," "an" and "the" include plural referents unless the context clearly dictates otherwise. Thus, for example, the term "a material" is intended to mean one or more materials, or a combination thereof.

As used herein, the terms "about" and "approximately" generally mean plus or minus 10% of the value stated. For example, about 10 would include 9 to 11, about 1000 would include 900 to 1100. In some instances, for example, with respect to lengths, "about" and "approximately" can mean plus or minus 0.1 mm. For example, about 0.5 mm would include 0.4 mm to 0.6 mm.

As described herein, a floor tile system can include floor tiles, each floor tile including multiple layers fixed together, for example, each floor tile can include a top, hard-surface, layer, and a bottom, wood polymer composite layer. The floor tiles can be interlocked with adjacent floor tiles such that edges of the top layers contact edges of the top layers of adjacent tiles, which can, in some embodiments, reduce or eliminate the need to add sealant between adjacent tiles. The top layer of each floor tile can be composed of a hard surface material, such as ceramic. The bottom layer of each floor tile can be composed of wood polymer composite, and can include portions for interlocking with adjacent bottom layers, for example tongue portions and/or groove portions.

FIG. 1A depicts a cross-sectional view of a floor tile 110 according to an embodiment. A floor tile system can include a set of floor tiles configured to cover an area. As shown in FIG. 1A, floor tile 110 includes a top portion 120 and a bottom portion 130. Furthermore, the bottom portion includes a main portion 132, a tongue portion 134 and a groove portion 36.

Top portion 120 can be composed of a hard surface material, such as for example, ceramic (e.g., porcelain), stone, etc. Top portion 120 can have a length LT, and a width (not shown in FIG. 1A). Top portion 120 can be fixed to bottom portion 130 with an adhesive (not shown). In some embodiments the adhesive can include, for example, TECHNOMELT PUR 310, also known as Pur-Fect 310.

Bottom portion 130 can be composed of a wood polymer composite (also referred to as wood plastic composite) and includes main portion 132, tongue portion 134 and groove portion 136. Main portion 132 of bottom portion 130 can have a length LM and a width (not shown in FIG. 1A. In some embodiments, bottom portion 130 can be monolithically formed, for example, extruded or injection molded (see, e.g., FIG. 1A). In some embodiments, a bottom portion can be formed using one or more layers of material.

Figure 1B:
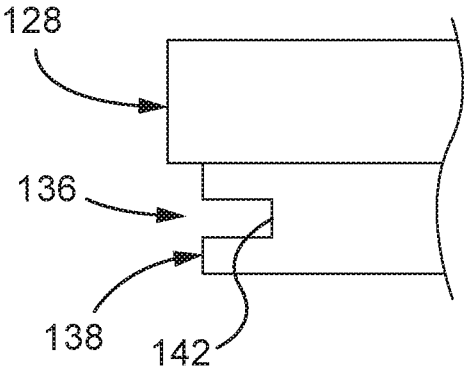
FIG. 1B is a cross-sectional view of a portion of the floor tile depicted in FIG. 1A.
Figure 1C:
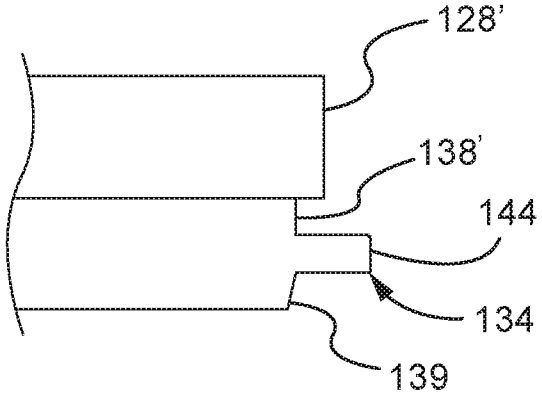
FIG. 1C is a cross-sectional view of a portion of the floor tile depicted in FIG. 1A.

As shown in FIGS. 1B and 1C, top portion 120 includes a first edge 128 and a second edge 128', bottom portion 130 includes a first edge 138 and a second edge 138', groove portion 136 extends into main portion 132 from first edge 138 and includes an end 142, and tongue portion 134 extends away from second edge 138' and includes an end 144. As shown in FIGS. 1A-1C, main portion 132 of bottom portion 130 can include a relief 139. Relief 139 can be angled to allow floor tile 110 to be interlocked with an adjacent floor tile at an angle and may reduce contact between elements of floor tile 110 and the surface being covered. While shown in FIGS. 1A-1C as being approximately 30 degrees, relief 139 can be other angles. In some embodiments, bottom portion 130 does not include relief 139, i.e., second edge 183' extends above and below tongue portion 144.

In some embodiments, top portion 120 is fixed to bottom portion 130 such that, as shown in FIGS. 1A-1C, first edge 128 of top portion 120 extends beyond first edge 138 of bottom portion 130, and second edge 128' of top portion 120 extends beyond second edge 138' of bottom portion 130. In this manner, when floor tile 110 is interlocked with a second floor tile (not shown), second edge 128' will contact a first edge of a top portion of the second floor tile, at least a portion of tongue portion 134 will be disposed within a groove portion of a bottom portion of the second tile, and end 144 of the tongue portion 134 will not contact an end of the groove portion of the bottom portion of the second tile.

As shown in FIGS. 1A-1C, tongue portion 134 and groove portion 136 are depicted as having substantially rectangular shaped cross-sections and having lengths $L_{BT}$ and $L_{BG}$, which are substantially equal, respectively. Furthermore, end 144 of tongue portion 134, and end 142 of groove portion 136, are depicted as having substantially linear/planar cross-sections. Finally, tongue portion 134 and end 144 collectively define a rectangular cross-section that corresponds with the rectangular cross-section shaped collectively defined by groove portion 136 and end 142. In some embodiments, tongue portion 132 and groove portion 134 can have different cross-section shapes, for example, square, triangle, etc, and end 142 and end 144 can have different cross-section shapes, for example, rectangle, square, triangle, semi-circular, oval, etc. Furthermore, in some embodiments, tongue portion 134 and end 144 can collectively define a cross-section that does not correspond with the cross-section shape collectively defined by groove portion 136 and end 142.

Figure 2:
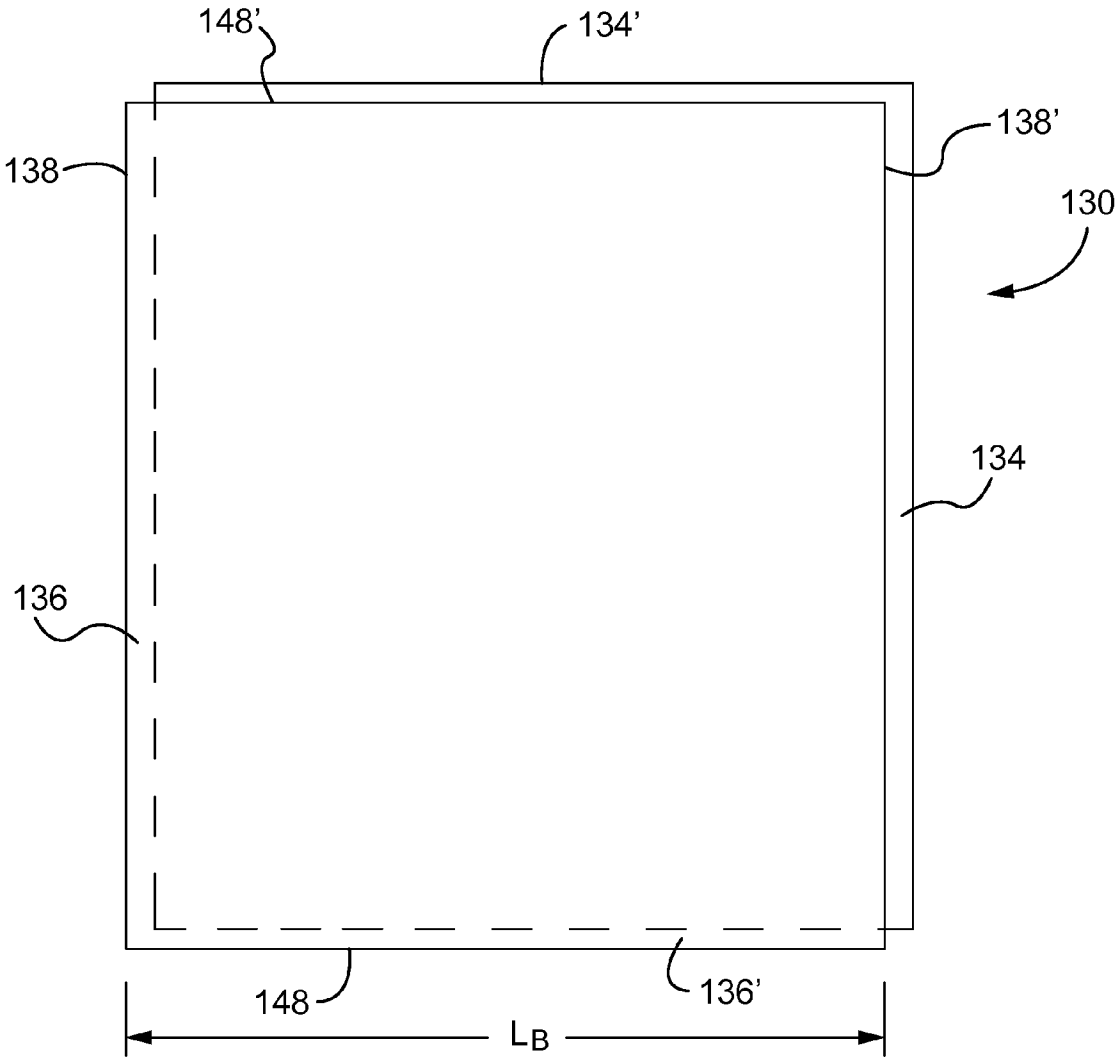
FIG. 2 is a top view of the floor tile depicted in FIG. 1A.

FIG. 2 is a top view of bottom portion 130 of floor tile 110. As shown in FIG. 2, the bottom portion 130 of floor tile 110 includes the tongue portion 134, a tongue portion 134', groove portion 136, and a groove portion 136'. Additionally, bottom portion 130 includes edge 138, edge 138', an edge 148, and an edge 148'. As shown in FIG. 2, tongue portion 134 is along edge 138' and is perpendicular to tongue portion 134' that is along edge 148'. Additionally, groove portion 136 is along edge 138 and is perpendicular to groove portion 136' that is along edge 148.

Figure 3A:
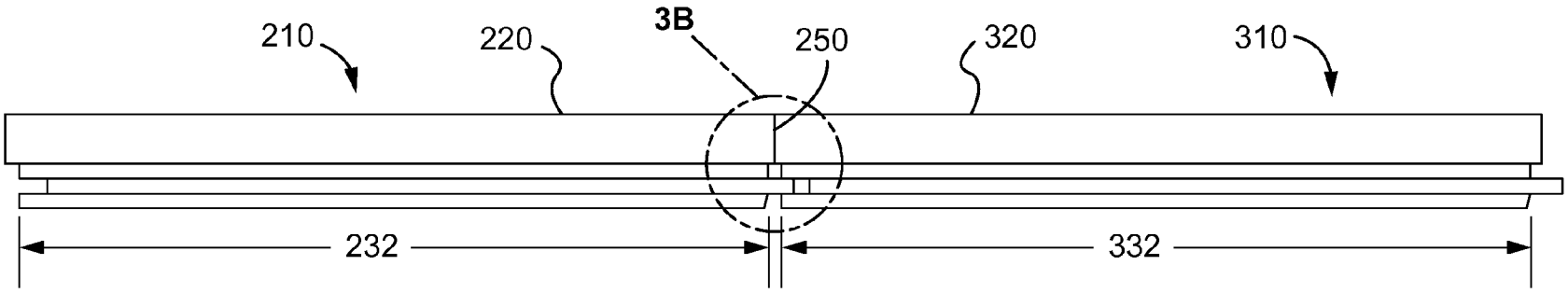
FIG. 3A is a cross-sectional view a first floor tile interlocked with a second floor tile according to an embodiment.
Figure 3B:
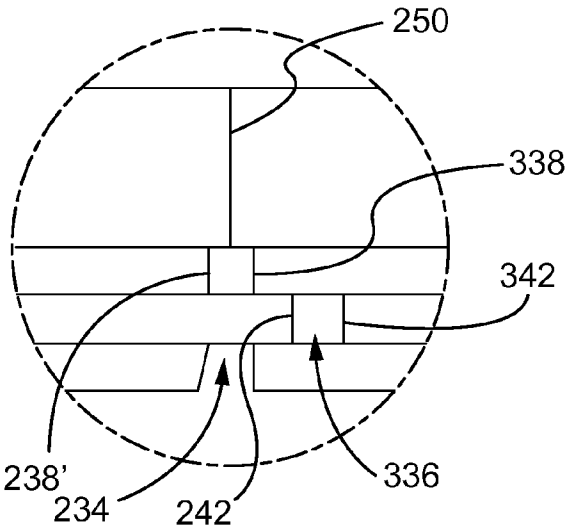
FIG. 3B is a cross-sectional view of a portion the first floor tile interlocked with a portion the second floor tile depicted in FIG. 3A

FIGS. 3A and 3B depict cross-sectional views of a first floor tile 210 interlocked with a second floor tile 310. Each of first floor tile 210 and second floor tile 310 can be similar to and have similar elements as floor tile 110. By way of example, first floor tile 210 includes a top portion 220 and a bottom portion 230, similar to top portion 120 and bottom portion 130 of floor tile 110, and second floor tile 310 includes a top portion 320 and a bottom portion 330, similar to top portion 120 and bottom portion 130 of floor tile 110. As shown in FIGS. 3A and 3B, top portion 220 of first floor tile 210 contacts top portion 320 of second floor tile 310 to form a seal 250. Seal 250 is a mechanical seal, i.e., does not rely on additional sealants to resist moisture from traveling through seal 250.

As shown in FIGS. 3A and 3B, an edge of top portion 220 extends beyond an edge 238' of bottom portion 230, and top portion 320 extends beyond an edge 338 of bottom portion 330. In this manner, when first floor tile 210 is interlocked with second floor tile 310, the edge of top portion 220 will contact the edge of top portion 320 to form seal 250. Additionally, at least a portion of a tongue portion 234 of bottom portion 230 will be disposed within a groove portion 336 of bottom portion of second floor tile 310, and an end 244 of tongue portion 234 will not contact an end 342 of groove portion 336.

Figure 4:
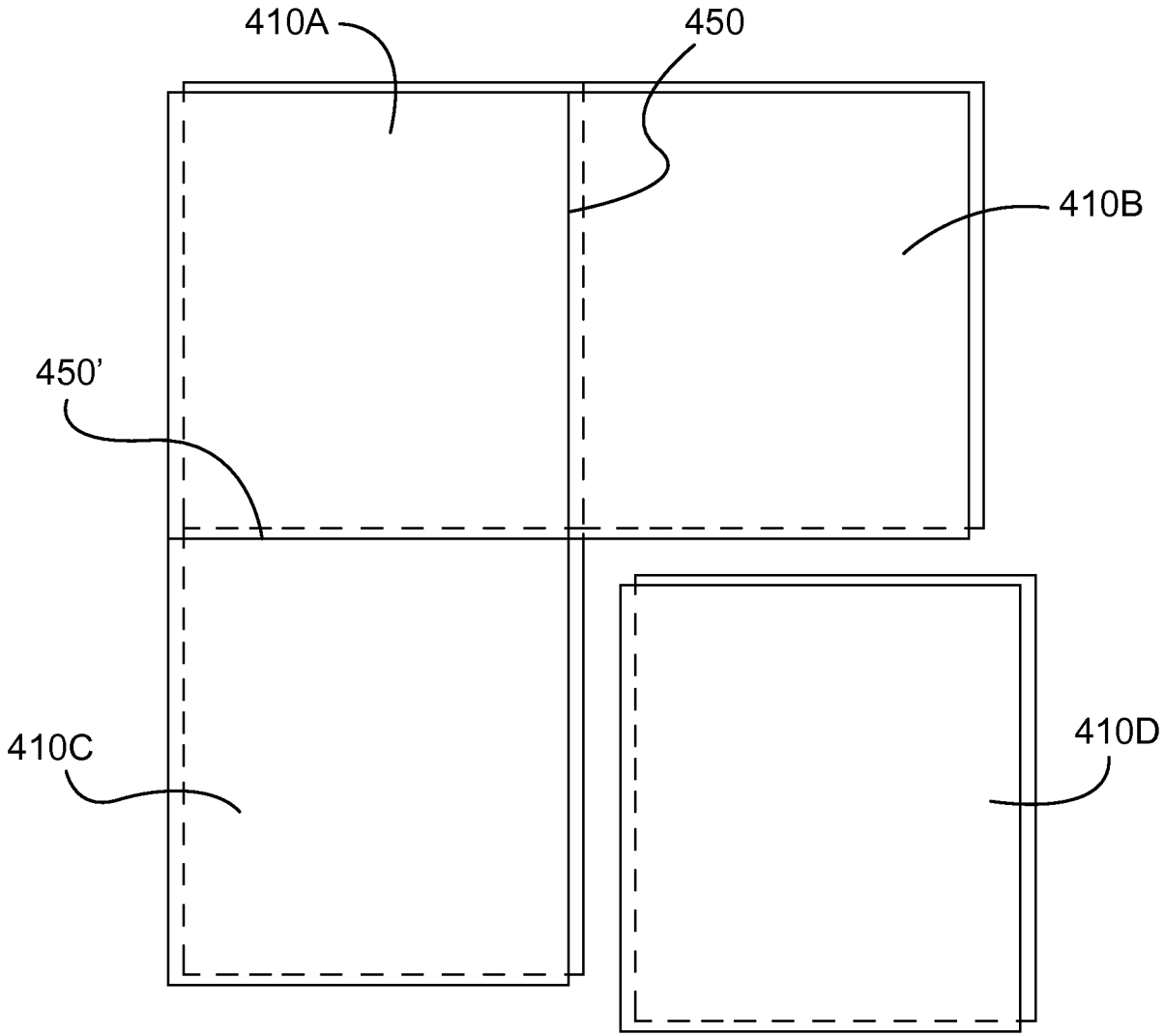
FIG. 4 is a top view of a system of floor tiles according to an embodiment.

FIG. 4 is a top view of a floor tile system 400 accordingly to an embodiment. Floor tile system includes floor tiles 410A, 410B, 410C, and 410D. As shown in FIG. 4, floor tiles 410A, 410B and 410C are installed to form seal 450 between floor tile 410A and floor tile 410B, and to form seal 450' between floor tile 410A and floor tile 410C. Installation of floor tile 410D will form a seal (not shown) between floor tile 410B and floor tile 410D, and will form a seal between floor tile 410C and floor tile 410D.

While shown in FIG. 4 as including 4 tiles, floor tile system 400 can include more or fewer tiles. Additionally, while each of floor tiles 410A, 410B, 410C, and 410D are shown as whole, in some embodiments, any of floor tiles 410A, 410B, 410C, and 410D, and/or additional tiles not show can be partial tiles in order to fit a particular area. Finally, while each of floor tiles 410A, 410B, 410C, and 410D are depicted in FIG. 4 as being substantially square in shape, specifically, top portion of the floor tiles (i.e., what is visible upon a completed installation of a floor tile system) are shown as square in shape, floor tiles 410A, 410B, 410C, and 410D, and any floor tile described herein, can be other shapes, for example, rectangular, and/or other sizes, as appropriate. Said another way, a floor tile system can include floor tiles with square top portions, floor tiles with rectangular top portions, floor tiles with square top portions and floor tiles with rectangular top portion, and any combination can include floor tiles with different size top portions.

In one example, a method includes assembling a floor tile system that includes at least a first floor tile and a second floor tile. Such a method includes defining and assembling the first floor tile and defining and assembling the second floor tile. The method includes defining, by injecting wood polymer composite into a mold to define a first bottom layer blank and machining the first bottom layer blank to define, a bottom layer of the second tile to include a main portion, a groove portion extending within the main portion at an edge of the main portion. The method includes defining, by cutting a ceramic material, a top layer of the second tile. The method includes fixing, using an adhesive, the top layer of the second floor tile to the bottom layer of the second floor tile such that an edge of the top layer of the second floor tile extends beyond the edge of the bottom layer of the second floor tile.

The method further includes defining, by injecting wood polymer composite into a mold to define a second bottom layer blank and machining the second bottom layer blank to define, a bottom layer of the first tile to include (1) a main portion, (2) a tongue portion extending beyond a first edge of the main portion, and (3) a groove portion extending within the main portion at a second edge of the main portion opposite the first edge, the base portion having a width. The method includes defining, by cutting a ceramic material, a top layer of the first floor tile to have a width greater than the width of the main portion of the bottom layer of the first floor tile. The method includes fixing, using an adhesive, the top layer of the first floor tile to the bottom layer of the first floor tile such that (1) a first edge of the top layer of the first floor tile extends beyond the first edge of the main portion of the bottom layer of the first floor tile and covers a portion of the tongue portion of the bottom layer of the first floor tile, (2) a second edge of the top layer of the first floor tile extends beyond the second edge of the main portion of the bottom layer of the first floor tile and covers a portion of the tongue portion of the bottom layer of the first floor tile.

While the method of manufacturing the first floor tile and the second floor tile above described injecting one or more molds with a wood polymer composite, other methods can include extruding wood polymer composite, assembling layers of injection molded and/or extruded wood polymer composite layers. As described above, the top layer can be cut, specifically, the top layer can be cut, and the edge ground (rectified) to a particular size and tolerance. While the method of manufacturing described above described cutting ceramic, other method appropriate for other materials can be used. Additional, the top layer, e.g., the hard surface layer, can be cast, molded, and/or otherwise formed to a particular size without cutting.

In one exemplary embodiment, a top portion of a floor tile can be about 198 mm wide and a main portion of a bottom portion of the floor tile can be 197 mm wide. In such an example, the top portion can be fixed to the bottom portion such that the top portion extends beyond a first edge of the bottom portion by 0.5 mm and can extend beyond a second edge of the bottom portion by 0.5 mm. In some embodiments, the total thickness of a floor tile can be between about 8.0 mm and about 10.5 mm. In such an embodiment, the bottom layer can be about 5 mm, and the top layer can be about 3 mm. In other embodiments, the total thickness of a floor tile can be between about 13 mm and about 15.5 mm. In such an embodiment, the bottom layer can be about mm and the top layer can be between about 8.0 mm to about 10.5 mm. In other embodiments, the top layer can range in thickness from about 3.0 mm to about 7.0 mm and the bottom layer can range in thickness from about 4 mm to about 8.0 mm.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially. While the embodiments have been particularly shown and described, it will be understood that various changes in form and details may be made.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified.

Although various embodiments have been described as having particular features and/or combinations of components, other embodiments are possible having a combination of any features and/or components from any of embodiments as discussed above.

What is claimed is:

1. A floor tile system, comprising:

a first floor tile and a second floor tile;

the second floor tile including:

a bottom layer [that is composed of a wood polymer composite and] having a main portion and a groove portion extending within the main portion at an outermost edge of the main portion; and a top layer [composed of ceramic tile and] fixed to the bottom layer such that an outermost edge of the top layer extends beyond the outermost edge of the bottom layer, the first floor tile including:

a bottom layer [that is composed of a wood polymer composite and] having a main portion, a tongue portion extending beyond a first edge of the main portion, and a groove portion extending within the main portion at a second edge of the main portion opposite the first edge such that the groove portion is disposed between an upper portion of the second edge of the main portion and a lower portion of the second edge of the main portion, the main portion having a width; and a top layer [that is composed of ceramic and] having a width greater than the width of the main portion, the top layer fixed to the bottom layer such that (1) a first edge of the top layer extends beyond the first edge of the main portion and covers a portion of the tongue portion, (2) a second edge of the top layer extends beyond the second edge of the main portion, the tongue portion of the bottom layer of the first floor tile configured to be inserted into the groove portion of the bottom layer of the second floor tile such that (1) an end of the tongue portion of the bottom layer of the first floor tile does not contact an end of the groove portion of the bottom portion of the second floor tile, and (2) the first edge of the top layer of the first floor tile contacts the outermost edge of the top layer of the second floor tile to define a seal.

2. The floor tile system of claim 1, wherein the seal is water resistant.

3. The floor tile system of claim 1, wherein the top layer of the first floor tile is fixed to the bottom layer of the first floor tile such that the first edge of that top layer extends beyond the first edge of the main portion of the bottom layer of the first floor tile by about 0.5 mm.

4. The floor tile system of claim 1, wherein the top layer of the first floor tile is composed of porcelain.

5. The floor tile system of claim 1, wherein the seal is a first seal, the floor tile system further comprising:

a third floor tile including:

a bottom layer [that is composed of a wood polymer composite and] having a main portion, a tongue portion extending beyond the main portion at an edge of the main portion; and a top layer [composed of ceramic tile and] fixed to the bottom layer such that an edge of the top layer extends beyond the edge of the bottom layer the tongue portion of the bottom layer of the third floor tile configured to be inserted into the groove portion of the bottom layer of the first floor tile such that (1) an end of the tongue portion the bottom layer of the third floor tile does not contact an end of the groove portion of the bottom portion of the first floor tile, and (2) the second edge of the top layer of the first floor tile contacts the edge of the top layer of the third floor tile to define a second seal.

6. The floor tile system of claim 1, wherein the top layer of the first floor tile is fixed to the bottom layer of the first floor tile with an adhesive.

7. The floor tile system of claim 1, wherein the tongue portion of the bottom layer of the first floor tile has a substantially rectangular cross-section.

8. An apparatus, comprising:

a first floor tile configured to be interlocked with a second floor tile that includes (1) a bottom layer [that is composed of a wood polymer composite and] having a base portion, a groove portion extending within the base portion at an outermost edge of the base, and (2) a top layer [composed of ceramic tile and] fixed to the bottom layer such that an edge of the top layer extends beyond the outermost edge of the bottom layer;

the first floor tile including:

a bottom layer [that is composed of a wood polymer composite and] having a base portion, a first tongue portion extending beyond a first outermost edge of the base portion, a second tongue portion extending beyond a second outermost edge of the base portion that is perpendicular to the first outermost edge of the base portion, a first groove portion extending within the base portion at a third outermost edge of the base portion opposite the first outermost edge such that the first groove portion is disposed between an upper portion of the third outermost edge of the base portion and a lower portion of the third outermost edge of the base portion, and a second groove portion extending within the base portion at a fourth outermost edge of the base portion opposite the second outermost edge of the base portion, the base portion having a width and a height;

a top layer [that is composed of ceramic and] having (1) a width greater than the width of the base portion and (2) a length greater than the length of the base portion, the top portion fixed to the base portion such that (1) a first edge of the top layer extends beyond the first outermost edge of the base portion and covers a portion of the first tongue portion, (2) a second edge of the top layer extends beyond the second outermost edge of the base portion and covers a portion of the second tongue portion, (3) a third edge of the top layer extends beyond the third outermost edge of the bottom layer, and (4) a fourth edge of the top layer extends beyond the fourth outermost edge of the bottom layer;

the first tongue portion of the first tile configured to be inserted into the groove portion of the second tile such that (1) an end of the first tongue portion of the first tile does not contact an end of the groove portion of the second tile, and (2) the first edge of the top layer of the first tile contacts the edge of the top layer of the second tile to define a seal.

9. The floor tile of claim 8, wherein the seal is water resistant.

10. The floor tile of claim 8, wherein the top layer of the first floor tile is composed of porcelain.

11. The floor tile of claim 8, wherein the top layer of the first floor tile is fixed to the bottom layer of the first floor tile with an adhesive.

12. The floor tile of claim 8, wherein the tongue portion of the bottom layer of the first floor tile has a substantially rectangular cross-section.

13. The floor tile of claim 8, wherein the top layer of the first floor tile is square and has a thickness of between approximately 3 mm and approximately 10.5 mm.

14. The floor tile of claim 8, wherein the top layer of the first floor tile is fixed to the bottom layer of the first floor tile such that the first edge of that top layer extends beyond the first outermost edge of the base portion of the bottom layer of the first floor tile by about 0.5 mm.

15. The floor tile system of claim 1, wherein, when the tongue portion of the bottom layer of the first floor tile is inserted into the groove portion of the bottom layer of the second floor tile such that the first edge of the top layer of the first floor tile contacts the outermost edge of the top layer of the second floor tile to define a seal, the outermost edge of the bottom layer of the second floor tile does not contact the first edge of the bottom layer of the first floor tile.

16. The apparatus of claim 8, wherein the first floor tile is configured such that when the first tongue portion of the first tile is inserted into the groove portion of the second tile and the first edge of the top layer of the first tile contacts the edge of the top layer of the second tile to define a seal, the first outermost edge of the bottom layer of the first floor tile does not contact the outermost edge of the bottom layer of the second floor tile.

*17. The floor tile system of claim 1, wherein the bottom layer of the first floor tile and the bottom layer of the second floor tile are each composed of a wood polymer composite.*

*18. The floor tile system of claim 1, wherein the top layer of the first floor tile and the top layer of the second floor tile are each composed of ceramic.*

*19. The apparatus of claim 8, wherein the bottom layer of the first floor tile and the bottom layer of the second floor tile are each composed of a wood polymer composite.*

*20. The apparatus of claim 8, wherein the top layer of the first floor tile and the top layer of the second floor tile are each composed of ceramic.*

* * * * *